United States Patent [19]

Gotcher et al.

[11] 4,176,027

[45] Nov. 27, 1979

[54] SHAPED ARTICLE OF RADIATION CROSSLINKED TRIAZINE-TRIONE POLYMERIC COMPOSITION

[75] Inventors: Alan J. Gotcher, Sunnyvale; Paul B. Germeraad, Palo Alto; Larry J. White, San Jose, all of Calif.

[73] Assignee: Raychem Corporation, Menlo Park, Calif.

[21] Appl. No.: 832,969

[22] Filed: Sep. 13, 1977

[51] Int. Cl.$^2$ .............................................. C08F 8/00
[52] U.S. Cl. .......................... 204/159.15; 204/159.17; 428/461; 428/462; 428/463; 525/375; 525/331
[58] Field of Search .................. 204/159.17, 159.16, 204/159.15; 260/884

[56] References Cited

U.S. PATENT DOCUMENTS

| | | |
|---|---|---|
| 3,840,619 | 10/1974 | Aronoff et al. .................. 260/878 R |
| 3,852,177 | 12/1974 | Atchison et al. ................. 204/159.17 |
| 3,923,621 | 12/1975 | Murayama et al. ............. 204/159.17 |
| 3,947,525 | 3/1976 | Robertson et al. ............. 204/159.17 |
| 4,039,631 | 8/1977 | Robertson et al. ............. 260/878 R |

Primary Examiner—Richard B. Turer
Attorney, Agent, or Firm—Lyon & Lyon

[57] ABSTRACT

Compounds useful as crosslinking agents have the formula:

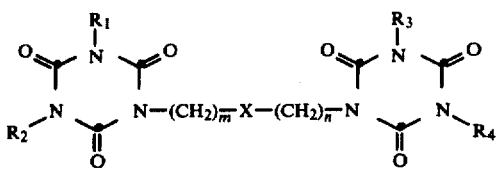

wherein $R_1$, $R_2$, and $R_3$ and $R_4$ are independently vinyl, allyl, methallyl, propargyl, crotyl, $C_1$ to $C_{18}$ alkyl, aryl or inert group substituted derivatives thereof and where X is a saturated or unsaturated alkylene moiety having up to 12 carbon atoms saturated or unsaturated $C_1$-$C_{18}$ heteroaliphatic, $C_5$-$C_{18}$ heteroaromatic, $C_5$-$C_{18}$ alicyclic or $C_1$-$C_{18}$ heterocyclic, where n and m are independently 0 or integers of from 1-12 inclusive. These compounds are particularly useful as crosslinking agents for high temperature processable (>200°) polymers, especially fluorocarbon polymers. Also described are polymer compositions comprising from about 0.1 weight percent to about 50 weight percent of said crosslinking agent or mixture of said crosslinking agents. The products resulting from melt fabrication and subsequent crosslinking of such compositions are useful as shaped articles, e.g., wire products. Most of said compounds are novel compositions of matter.

2 Claims, 1 Drawing Figure

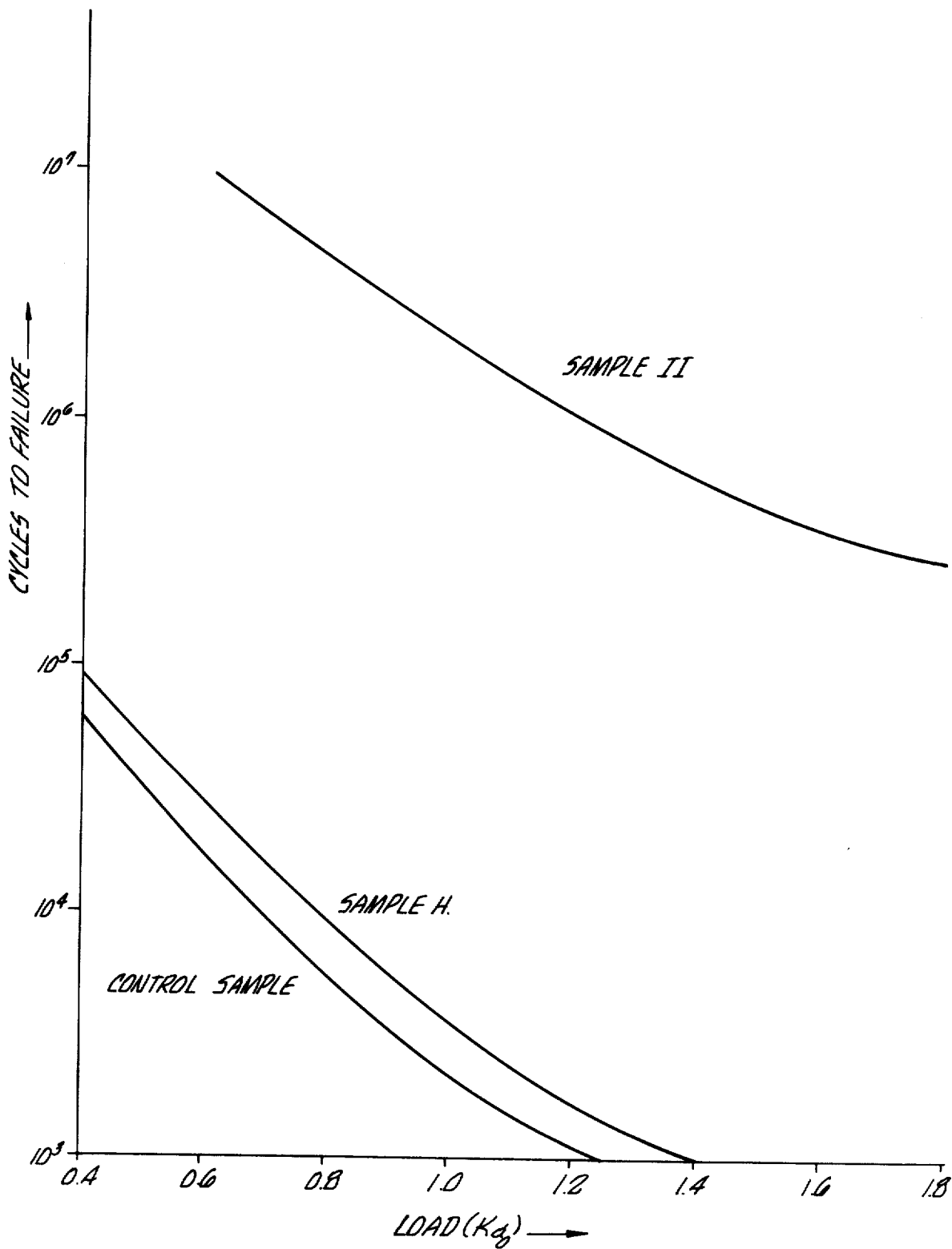

SHAPED ARTICLE OF RADIATION CROSSLINKED TRIAZINE-TRIONE POLYMERIC COMPOSITION

BACKGROUND OF THE INVENTION

1. Field of Invention

This invention relates to novel compositions of matter useful as crosslinking agents in melt-processable and radiation crosslinkage polymer compositions.

2. Description of the Prior Art

It has been proposed to irradiate fluorocarbon polymers and other high temperature polymers to improve their mechanical properties at elevated temperatures. Suitable ionizing radiation includes gamma rays and accelerated electrons. As a rule, degradation, rather than crosslinking, predominates when such polymers are subjected to melt treatment. Frequently, heating or annealing of such polymers subsequent to irradiation is said to improve their mechanical properties. It has also been reported that small amounts of unsaturated compounds such as triallyl cyanurate (TAC) or its isomer, triallyl isocyanurate (TAIC), function in such polymers, especially fluorocarbon polymers, as a crosslinking promoter during exposure to radiation.

It has also been reported that fluorocarbon polymer compositions containing relatively volatile crosslinking promoters e.g., TAC or TAIC, cannot be melt processed, such as by extrusion or injection molding, when the polymeric composition requires a processing temperature above about 250°. For a variety of polymers, such temperatures are needed to fabricate shaped articles such as wire insulation, sheets, film, tubing, gaskets, and boots. Polymer compositions containing prior art crosslinking agents tend to prematurely crosslink and to form gels or lumps, discolor and often to form voids in the final product. For example, as set forth in detail in U.S. Pat. Nos. 3,763,222; 3,840,619; 3,894,118; 3,911,192; 3,970,770; 3,985,716; 3,995,091 and 4,031,167 it is seen that substantial difficulty has been experienced in providing heat stable crosslinking agents suitable for use with fluorocarbon polymers that demonstrate low volatility and high crosslinking efficiency. In fact, no single compound, or mixture of compounds, has provided the unique combination of properties, such as low volatility, high polymer compatibility, high thermal stability and high unsaturation content, required to produce high crosslinking efficiencies in melt processed polymer compositions. All known prior art compounds suffer from one or more dificiencies, e.g., poor polymer compatibility or poor chemical stability, which lead to inferior polymer products that contain heterogeneities, decomposition products or discoloration which demonstrate undesirably low mechanical performance. There is no known crosslinking agent which provides entirely satisfactory properties in melt processed, high temperature polymer compositions. We have now unexpectedly discovered that the above deficiencies can be obviated by the use of certain crosslinking agents and their novel compositions in polymers as described hereinafter.

BRIEF DESCRIPTION OF THE DRAWING

The FIGURE is a graph demonstrating the crosswire wear resistance of thin wall insulation (10 mil.) on 20 AWG tin-plated copper. The insulation of the control sample is an uncrosslinked ethylene-tetrafluoroethylene copolymer. The insulation of Sample H is a crosslinked ethylene-tetrafluoroethylene copolymer using a prior art crosslinking agent. The insulation of Sample II is crosslinked ethylene-tetrafluoroethylene copolymer using a crosslinking agent according to the present invention.

DESCRIPTION OF THE INVENTION

The novel crosslinking agents of the present invention are triazinetrione compounds of the following generic formula:

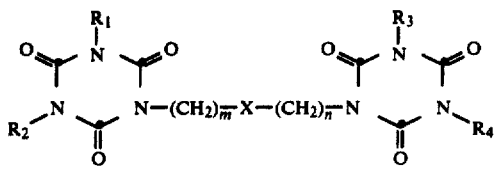

wherein $R_1$, $R_2$, $R_3$ and $R_4$ are independently vinyl, allyl, methallyl, propargyl, crotyl, $C_1$ to $C_{18}$ alkyl or an aryl moiety having 6 to 14 ring carbons any of which $R_1$ through $R_4$ groups may be unsubstituted or substituted with one or more inert substituent groups; wherein X is a saturated or unsaturated alkylene moiety of 1 to 12 carbons provided that when all of $R_1$ through $R_4$ are allyl, said saturated alkylene moiety contains at least 7 carbons, saturated or unsaturated $C_1$ to $C_{18}$ heteroaliphatic, $C_5$ to $C_{18}$ heteroaromatic, $C_5$ to $C_{18}$ alicyclic and wherein m and n are independently 0 or an integer of 1 to 12 provided that if X is phenyl, n shall be at least 1. The compounds are particularly useful as crosslinking agents for high temperature stable polymers. Also described are polymer compositions comprising from about 0.1 weight percent to about 50 weight percent of a crosslinking agent or mixture of crosslinking agents of the structural formula:

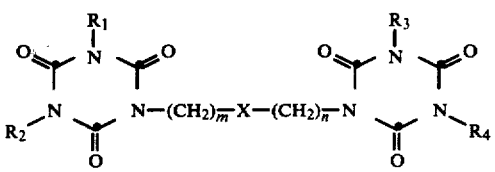

wherein $R_1$, $R_2$, $R_3$ and $R_4$ are independently vinyl, allyl, methallyl, crotyl, $C_1$ to $C_{18}$ alkyl or an aryl moiety any of which $R_1$ through $R_4$ groups may be unsubstituted or substituted with one or more inert substituent groups; wherein X is a saturated or unsaturated alkylene moiety of 1 to 12 carbons, saturated or unsaturated $C_1$ to $C_{18}$ heteroaliphatic, $C_5$ to $C_{18}$ heteroaromatic, $C_5$ to $C_{18}$ alicyclic or heterocyclic and wherein m and n are independently 0 or an integer of 1 to 12. The products resulting from melt fabrication and subsequent crosslinking of such compositions are useful as shaped articles, e.g., wire products.

The following list is representative of some of the starting materials suitable to provide moiety X:
dibromomethane
1,2-dibromoethane
1,1-dichloroethane
3,3-dichloroethanol
1,2-dichloropropane
1,3-dichloropropane
1,4-dibromobutane
1,3-dibromobutane
2,3-dichlorobutane 1,4-dibromobut-2-ene
1,4-dichlorobut-2-yne
1,7-dichloroheptane
1,4-dichlorocyclohexane
1,4-dibromobenzene
α,α-dichloroxylene
1,3-dichloropropan-2-one
1,2-diiodoethane
1,2-dibromo-3-chloropropane
chloromethyl ether
α,α-dichloromethyl ether
trans-1,2-dichlorocyclohexane 3,6-dichloro-1,2-cyclohexanedione
1,3-dichloro-2-propanol
dichloro acetic acid
3-chloro-(2-chloro methyl) propene
dibromoacetonitrile
1,3-dibromo-5,5-dimethyl hydantoin
1,2-dibromoethyl benzene
α,α,α-trichlorobenzene
trichloroacetonitrile
1,1,1-tribromoethanol The most preferred compounds of the present invention have the following structural formulae:

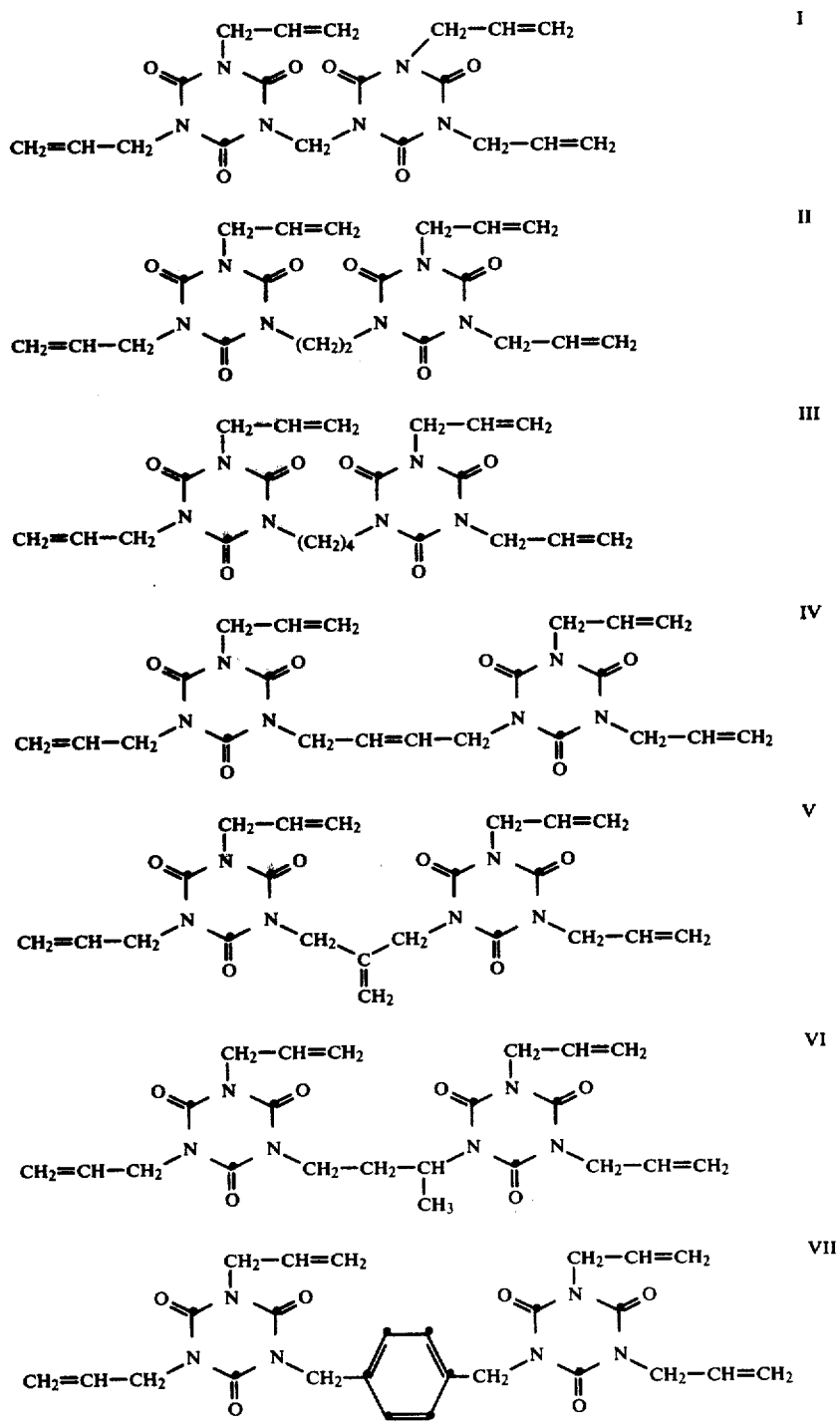

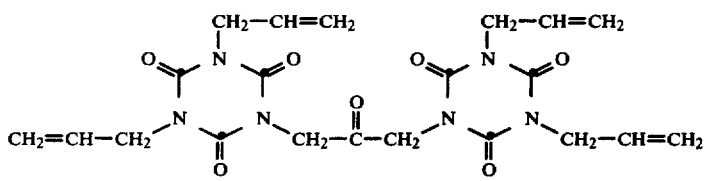

VIII

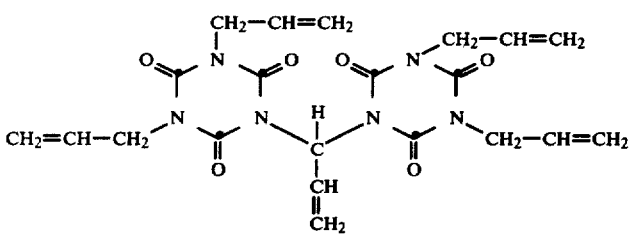

IX

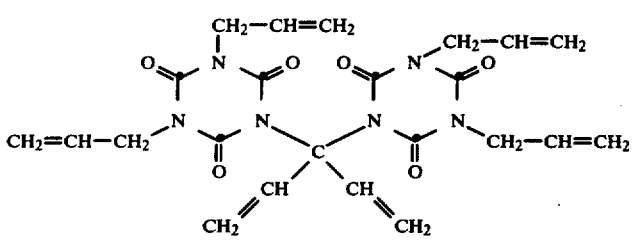

X

Compound II wherein $R_1$, $R_2$, and $R_4$ are allyl and X is ethanediyl is taught by the prior art [Chem. Abstr. 66: 55464x, Balitskaya et al., Zh. Organ. Khim 2, 1421 (1966) and Chem. Abstr. 80: 38672, Balitskaya et al., Sin. Fiz.-Khim. Polim. 11, 129 (1973)] as a monomer from which they attempted to produce, unsuccessfully an isocyanurate polymer; similarly, compound III wherein $R_1$, $R_2$, $R_3$ and $R_4$ are allyl and X is butanediyl has been synthesized and reported [Chem. Abstr. 78: 58364y, Fedorenko et al., Sin. Fiz.-Khim. Polim. 10, 15 (1972)], however, no use for the compound was taught. All other compounds comprehended by the formulae I through X are believed to be novel.

The successful manufacture of shaped articles, e.g., wire insulation, sheet, and film, from crosslinked fluorocarbon polymer compositions requires that a formulation be stable during melt fabrication at elevated temperatures and subsequently develop a high level of crosslinking upon exposure to irradiation. A wide variety of compounds have been proposed in the prior art as suitable crosslinking agents for fluorocarbon polymer compositions. Unfortunately, all prior art crosslinking agents are deficient either in processing stability at temperatures above about 250° or ineffective to develop high levels of cross-linking upon exposure to irradiation. For example, the prior art compounds triallyl cyanurate or triallyl trimesate, as disclosed in U.S. Pat. Nos. 3,738,923 and 3,840,619, exhibit excessive volatility at the processing temperature of ETFE polymers and several other of the more useful fluorocarbon polymers. This excessive volatility results in a void-containing shaped article after melt processing. Alternatively, fluorocarbon polymer compositions containing other prior art compounds (e.g., phenylindan esters, 4,4'-dicarboxydiphenyl ether esters and sulfonyl dibenzoic acid esters, as described in U.S. Pat. Nos. 3,911,192; 3,970,770; and 3,995,091) develop crosslinking levels after irradiation which are ineffective to improve the physical properties of the composition, especially at elevated temperatures. We have found that no crosslinking agent known to the art has the prerequisite processing stability and, simultaneously, the high sensitivity to irradiation required to produce fluorocarbon polymer compositions which exhibit substantially improved performance.

Some of the triazine trione compounds of the present invention are novel compositions of matter. This invention also relates to polymeric compositions comprising high processing temperature polymers, especially fluorocarbon polymers, containing one or more triazine trione containing crosslinking agents. This invention also relates to wire insulated with, and cable jacketed with, the aforesaid polymeric compositions in crosslinked form.

The crosslinking agents of the present invention are particularly useful for enhancing the crosslinking of fluorocarbon polymers which are melt processed at temperatures of 200° or greater, especially 250° or greater. Additionally, the crosslinking agents of the present invention improve the elevated temperature mechanical properties of the crosslinked polymers, especially abrasion and deformation resistance. Fluorocarbon polymers with which the crosslinking agents of the present invention may advantageously be utilized include homopolymers, copolymers and terpolymers such as ethylene-tetrafluoroethylene copolymers (ETFE polymers), ethylene-chlorotrifluoroethylene copolymers, polyvinylidene fluoride homopolymers, tetrafluoroethylene-vinylidene fluoride copolymers, tetrafluoroethylene-hexafluoropropylene copolymers, vinylidene fluoride-hexafluoropropylene copolymers, vinylidene fluoride-hexafluoro-propylene-tetrafluoroethylene terpolymers and the like. Mixtures of any of the above enumerated polymers may also be advantageously radiation crosslinked using the crosslinking agents of the present invention. A fluorocarbon polymer as that term is used herein, may be further defined as a polymer chain which contains by weight more than about 10 percent fluorine.

These crosslinking agents are suitably present in the polymer in an amount ranging from about 0.1 to 50 percent, but will normally be employed in the range of about 1–20 percent. The polymer, or polymers, and crosslinking agents are most preferably blended in the melt at an elevated temperature for a period of time sufficient to give a homogeneous mass, but insufficient to crosslink. The mixture is then shaped formed as desired, cooled to ambient temperature, and the formed, cooled article irradiated to effect crosslinking of the polymer.

Especially where less severe processing temperatures are involved, the crosslinking agents of the present invention can, if desired, be utilized in conjunction with one or more of the crosslinking agents taught by the prior art, especially those mentioned in U.S. Pat. Nos. 3,763,222; 3,840,619; 3,894,118; 3,911,192; 3,970,770; 3,985,716; 3,995,091 and 4,031,167.

When a polymeric composition according to the present invention is employed as an insulation coating, as for example, on wire, the composition is extruded by conventional techniques directly onto the surface of the conductor, preferably as a relatively thin coating. Thereafter, the extruded composition, while on the surface of the conductor, is subjected to a dose of radiation sufficient to provide the desired degree of crosslinking without substantially degrading the polymeric material. It has been determined that a radiation dose in the range of about 1–40 megarads, and preferably about 3–20 megarads, is suitable to provide the desired degree of crosslinking.

Additional adjuvants such as fillers including silica and carbon black, stabilizers, antioxidants, coloring agents and additional plasticizers and/or crosslinking agents may suitably be incorporated into the fluorocarbon polymers in addition to the crosslinking agents of the present invention.

The compositions and compounds of the present invention possess a combination of properties which make them uniquely superior to the prior art crosslinking agents or compositions thereof. These compounds create significantly, and commercially important, higher levels of crosslinking with concurrent mechanical property improvements, than other known crosslinking agents, without compromising the processability of the fluorocarbon polymer compositions. This novel finding is clearly demonstrated in Tables II-IV which relate processability, crosslink density and resultant property improvements.

Although the previous description of this invention has been stated in terms of crosslinking fluorocarbon polymers, it should be understood that the compounds of the present invention are also useful to effect or enhance the radiation crosslinking of other radiation cross-linkable polymers including halogenated polymers such as polyvinyl chloride and polyvinylidene chloride, polyolefins such as polyethylene, polypropylene and ethylene-propylene copolymers, copolymers and terpolymers of ethylene with other olefinic monomers such as vinyl acetate and ethyl acrylate, high performance polymers such as polyarylene ether ketone (e.g., Raychem Stilan), polyarylene ether sulfone (e.g., Union Carbide Udel or Radel), polyphenylene oxide (e.g., General Electric PPO), polyesters such as polyoxybenzoate (e.g., Carborundum Exxel) and polybutylene terephthalate (e.g., Eastman Tenite); polyamides (e.g., Dynamit Nobel Trogamid), polycarbonates (e.g., General Electric Lexan), and high performance thermoplastic elastomers such as polyester ether block copolymers (e.g., Du Pont Hytrel) and polyurethane ether block copolymers. The conditions of radiation and amount of crosslinking agent used in such polymers are substantially the same as for the fluorocarbon polymers. It should be noted that the compounds of the present invention can, under certain circumstances, be advantageously used in conjunction with other crosslinking agents to effect or enhance the radiation crosslinking of polymers. In addition, the compounds of the present invention, mixtures thereof, or mixtures thereof with from about 0.1 to about 50 weight percent of other prior art crosslinking agents have been found to plasticize polymers, especially at elevated temperatures such as the polymer processing temperature. It is apparent to those skilled in the art that the degree of plasticization is dependent upon the amount of crosslinking agent introduced into the polymer formulation, that is, higher levels impart substantially greater levels of plasticization to the polymer as to allow a reduction to be made in the processing temperature of the polymer composition. These compositions can thereafter be crosslinked to impart superior mechanical properties to the end product. Furthermore, it is apparent to those skilled in the art that the means of initiating the crosslinking reactions should not be restricted to simply radiation induced crosslinking reactions but should be more widely envisioned to include other radical induced crosslinking reactions, e.g., thermally induced peroxide decomposition.

This invention is further illustrated by examples which serve to illustrate specific details, aspects and embodiments of the invention. All parts are by weight unless otherwise indicated. All temperatures throughout the specification and claims are in degrees Celsius. All tests unless otherwise indicated were carried out at 23°. The melting point of a polymer composition as that term is used herein is defined as a temperature above the crystalline melting point of the major crystalline component contained in the polymer composition. Fluorocarbon polymers which may advantageously be utilized in the present invention have melting points above about 200°. Additionally, if the polymer composition comprises essentiallly no crystalline material, the melting point of a polymer composition is further defined by a temperature at which the polymer composition has a viscosity of not more than about $2 \times 10^6$ poise. The majority of polymeric compositions useful in the practice of the present invention have a viscosity of less than about $10^5$ poise at temperatures above the melting point. The term inert substituent connotes a substituent which is free from hydrogen atoms having an ionization constant greater than about $10^{16}$. Suitable substituents include halogen, aliphatic or aromatic hydrocarbons, ketones, cyanogens, and amines. The term wire can connote either bared conductor or jacketed conductor as is apparent from the context.

Certain of the tests utilized are first described.

SCRAPE ABRASION TEST

A length of wire is rigidly mounted under tension in a jig and a weighted 90° wedge shaped knife blade having a 5 mil radius at the knife edge is then mounted crosswise to the wire with the knife edge resting on the wire. The knife edge can be loaded with varying weights (3 lbs in the examples) to increase the bearing force of the blade on the wire. To test the scrape abrasion resistance of a given wire the blade is reciprocated with a 2" stroke longitudinally along the wire at a rate of 60 strokes (i.e., 30 cycles) per minutes. Failure occurs when the knife edge contacts the conductor causing an electrical circuit to close.

FLAMMABILITY TEST

The flammability tests were performed in a sheet metal cabinet conforming to FED-STD-191, method 5903 as follows: Two inches of insulation were removed from one end of an 18-inch specimen and the specimen was mounted vertically under tension with the bared conductor angularly disposed from the vertical so as to enable the Bunsen burner to be mounted vertically directly under the test specimen. A 1.5-inch high yellow flame from a Bunsen burner was applied to the specimen at the junction of the insulation and the bare conductor in such a manner that the lower end of the insulation was located 0.75 inches into the flame. After 12 seconds of flame application, the burner was removed from below the specimen and immediately turned off. The burn length and the time of burning after removal of the flame are recorded. The burn length was the distance from the original bend made in the conductor to the farthest point of damage. Damage is signified by bared conductor and/or charred insulation.

CROSS-WIRE ABRASION TEST

The test involves rubbing two crossed wires against each other in a controlled manner, thereby simulating the chafing action that can occur for example in high-vibration-areas of aircraft.

The test utilizes a small vibration tester that is rigidly mounted on a heavy steel frame so that the axial motion is in a horizontal plane. The axial drives are coupled to a rocker arm through a spring steel rod. A curved specimen holder is mounted on the rocker arm. The radius of curvature of this specimen holder is such that the upper surface of the specimen forms an arc whose center is located at the center of rotation of the rocker arm. Therefore, as the specimen is displaced horizontally it does not have any vertical movement.

The second (upper) specimen is mounted on the underside of a beam which is fastened to the frame through a thin strip of a TiNi alloy that acts as a hinge and allows the beam to be displaced only in a vertical direction.

The beam and the movable specimen holder are positioned so that each of the wires forms an angle of 30° with the axis of the axial driver. Therefore, the included angle between the crossed wires is 60°. As the lower specimen is driven, the symmetrical arrangement about the driver axis results in a wear pattern that is the same for both specimens. Any other angle would still provide substantially equal wear patterns as long as the axial driver moves along the bisector of the included angle.

The force between the wires is provided by a rubber band that serves as a bungee. The actual force is measured with a Hunter force gauge. Force measurements are made before and after each test by varying a threaded tension adjustment until the upper specimen separates from the lower specimen. A microscope is used to determine the point of separation.

The plot (FIG. 1) discussed in Example VI shows the effect of the applied force on the wear resistance (cycles to failure) of each of the types of wire described above. As is apparent, wire insulated with crosslinked ETFE polymer in accordance with the teaching of the present invention provides greater wear resistance at any of the applied force levels tested than wire made according to the prior art.

CUT THROUGH TEST

A sample of the wire is laid between an anvil and a 90° included angle wedge shaped weighted knife blade having a 5 mil flat at the knife edge. The anvil is hung by means of a stirrup from the load cell of an Instron tensile tester and the knife blade mounted on the movable bar of said tensile tester so that the blade edge lies transversely over the wire specimen. The knife edge is advanced towards the wire conductor at a speed of 0.2 inches per minute. Failure occurs when the knife edge contacts the conductor. The resulting electrical contact causes the tensile tester to stop advancing the blade. The peak reading from the load cell is taken to be the cut through resistance of the wire. This cut through test is not to be confused with a cut through test identified by Bowers et al. (IEC Product R&D 1, 89 (1962); this latter test simulates an accelerated creep measurement of a polymeric resin whose viscoelastic flow was altered by radiation crosslinking. Further information pertaining to enhancement at polymer creep resistance through crosslinking can be found in "Mechanical Properties of Polymers and Composites," by L. E. Nielsen, Vol. 1, p. 89, 1974.

MODULUS MEASUREMENT

To determine the relative level of crosslinking in these resins, a modulus test conducted at 320° was used because conventional methods to determine crosslinking levels by gel analysis require the use of polymer solvents. In the case of ETFE polymers, there are no known solvents below 200°. This modulus test measures the stress required to elongate a resin by 100% at a temperature of 320°. High values obtained from this test indicate increased resistance to elastic deformation or development of a greater degree of three dimensional network. The 320° temperature was chose as it is intermediate between the decomposition temperature ($\sim 350°$) and the crystalline melting point ($\sim 280°$) for ETFE polymers. The modulus measurement expressed as the $M_{100}$ value can be calculated by:

$$M_{100} = \frac{\text{stress in pounds to elongate sample by 100\%}}{\text{initial cross-sectional area in square inches}}$$

Should the sample rupture prior to 100% elongation, the $M_{100}$ is calculated using the equation:

$$M_{100} = \frac{\frac{\text{stress in pounds to elongate sample by 100\%}}{\text{elongation at rupture}}}{\text{initial cross-sectional area in square inches}}$$

In the following examples monomer contents in the compositions of the examples were calculated from the nitrogen content of the blends determined by the Kjeldahl method.

EXAMPLE I

A sample of bis-[3,5-di(2-propenyl)-s-triazine-2,4,6-(1H, 3H, 5H)-trione]-1,2-ethane was prepared. Two liters 2-propanol and 60.3 parts sodium hydride were combined, heated to 70° and 555 parts 3,5-di(2-propenyl)-s-triazine-2,4,6-(1H, 3H, 5H)-trione was added. The reaction mixture was refluxed for 1.5 hours.

1.5 Liters of 2-propanol were distilled from the reaction mixture at atmospheric pressure and then 4.5 liters of dimethyl formamide (DMF) were added. The distillation of 2-propanol was resumed under reduced pressure to maintain a reflux temperature of 40°. A total of 2 liters of 2-propanol and ca. 0.5 liters of DMF was removed by distillation. 224.9 parts 1,2-dibromoethane was added, the reaction temperature was increased to 95° and maintained at this temperature for 2.5 hours. The hot reaction mixture was poured into 10 liters of water and allowed to crystallize. The precipitate was isolated by filtration and dissolved in 5 liters of benzene. After extraction with 5 liters of 3% aqueous sodium carbonate, 5 liters of water (twice), the benzene solution was washed with saturated sodium chloride solution, dried over magnesium sulfate and filtered. The benzene was removed by rotary evaporation and the oily residue was crystallized from 0.7 liters of diethyl ether to yield 370 parts of the desired compound. Recrystallization from 2-propanol gave 350 parts bis-[3,5-di(2-propenyl)-s-triazine-2,4,6-(1H,3H,5H)-trione]-1,2-ethane, 65% yield, mp 70°-72°, tlc, $SiO_2/CHCl_3$ one spot; nmr, $\delta$ ($CDCl_3$) ppm, 5.50 (multiplet, 12H, $\underline{CH_2}=\underline{CH}-CH_2$) 4.38 (doublet, 8H, CH—$\underline{CH_2}$—N<) and 4.21 (singlet, 4H, >N—$\underline{CH_2}$—$\underline{CH_2}$—N<); ir (KBr) $cm^{-1}$, 940 (m, allylic H), 1000 (s, allylic H), 1470 (s, C—N) and 1695 (s, C=O).

Seven additional exemplary crosslinking agents were prepared by analogous reactions from 3,5-di(2-propenyl)-5-triazine-2,4,6-(1H, 3H, 5H)-trione and the appropriate dihalo-substituted compound. The identity of each crosslinking agent was confirmed by spectral and elemental analysis. These data, including reaction yields, synthetic comments and melting points are shown in Table I.

TABLE I

Spectral and Elemental Analysis of Several Crosslinking Agents

| Crosslinking Agents Identification Structure | Yield % | MP[2] degrees | PMR Identification[1] of Bridging Group | | | | Elemental Analysis | | | | | | | | Synthetic Comments |
|---|---|---|---|---|---|---|---|---|---|---|---|---|---|---|---|
| | | | δ ppm | Splitting | No. of Protons | Assignment | Calculated | | | | Found | | | | |
| | | | | | | | C | H | N | O | C | H | N | O | |
| I | 65 | 127 | 6.05 | s | 2 | —CH$_2$— | 53.02 | 5.15 | 19.53 | 22.30 | 52.86 | 5.21 | 19.49 | 22.44 | ethanol substituted for 2-propanol |
| II | 65 | 70 | 4.21 | s | 4 | —CH$_2$—CH$_2$— | 54.05 | 5.44 | 18.91 | 21.60 | 54.11 | 5.56 | 18.83 | 21.50 | none |
| III | 72 | 80 | 1.70 3.90 | t t | 4 4 | —CH$_2$—CH$_2$— —N—CH$_2$— | 55.92 | 5.97 | 17.79 | 20.32 | 55.85 | 5.99 | 17.74 | 20.42 | None |
| IV | 78 | 120 | 5.02– 6.60 | m | 2 | —CH=CH—[3] | 56.17 | 5.57 | 17.86 | 20.40 | 56.19 | 5.60 | 17.96 | 20.25 | None |

TABLE I-continued
Spectral and Elemental Analysis of Several Crosslinking Agents

| Crosslinking Agents Identification Structure | Yield % | MP[2] degrees | PMR Identification[1] of Bridging Group | | | | Elemental Analysis | | | | | | | | Comments |
|---|---|---|---|---|---|---|---|---|---|---|---|---|---|---|---|
| | | | δ ppm | Split-ting | No. of Pro-tons | Assignment | Calculated | | | | Found | | | | Synthetic |
| | | | | | | | C | H | N | O | C | H | N | O | |
| V | 41 | 101 | 4.55 | s s | 4 2 | $\rangle$N—CH$_2$—C= $\|$ —CH$_2$—C— $\|$ CH$^2$ | 56.17 | 5.57 | 17.86 | 20.40 | 55.97 | 5.61 | 17.99 | 20.43 | none |
| VI | 56 | 77 | 1.22 2.0— 2.62 3.6— 4.00 | d m m | 3 2 2 | —CH$_3$ —CH$_2$—CH$_2$—CH— $\rangle$N—CH$_2$—CH$_2$— | 55.92 | 5.97 | 17.79 | 20.32 | 55.93 | 5.98 | 17.86 | 20.23 | oiled from reaction mixture, crystallized upon standing after elution from silica gel column. |
| VII | 55 | 147 | 4.90 7.20 | s s | 4 4 | $\rangle$N—CH$_2$—φ —CH$_2$ —CH$_2$ | 59.99 | 5.42 | 16.15 | 18.44 | 60.08 | 5.51 | 16.17 | 18.24 | none |

TABLE I-continued
Spectral and Elemental Analysis of Several Crosslinking Agents

| Crosslinking Agents Identification | Structure | Yield % | MP[2] degrees | PMR Identification[1] of Bridging Group | | | | Elemental Analysis | | | | | | | | Synthetic Comments |
|---|---|---|---|---|---|---|---|---|---|---|---|---|---|---|---|---|
| | | | | δ ppm | Split-ting | No. of Pro-tons | Assignment | Calculated | | | | Found | | | | |
| | | | | | | | | C | H | N | O | C | H | N | O | |
| VIII | CH₂=CH—CH₂ and CH₂—CH=CH₂ substituents on hydantoin rings bridged by —CH₂—C(O)—CH₂— | 15 | 118 | 4.80 | s | 4 | —CH₂—C(O)—CH₂— | 53.39 | 5.12 | 17.79 | 23.70 | 53.21 | 5.10 | 17.89 | 23.80 | none |

[1]CDCl₃ solvent, TMS internal standard; spectral analysis of each compound provided the following structural similarities: 4.40 (d, 8H, >N—CH₂—CH=CH₂) and 5.90 (m, 12H, >N—CH₂—CH=CH₂).

[2]Uncorrected

[3]The bridging group consists of >N—CH₂—CH=CH—CH₂—N<; the underlined protons cannot be resolved from the methylene protons contained in the allyl substituents >N—CH₂—CH=CH₂

EXAMPLE II

As previously indicated, a combination of factors controls the processing characteristics and radiation response of polymer compositions which contain crosslinking agents. Polymeric compositions of the present invention possess a unique combination of stable processing behavior and exceptional radiation response leading to shaped polymeric articles of enhanced mechanical properties. These points are clearly demonstrated in the following examples.

To illustrate the stable processing behavior of ETFE polymer formulations which contain compounds of the present invention, a variety of prior art and novel unsaturated triazine-trione compounds were selected for evaluation as crosslinking agents in identical polymer formulations. The temperature at which these crosslinking agents undergo thermally induced polymerization ($T_p$) was evaluated by differential scanning calorimetry of the compound alone at a heating rate of 20°/minute under a nitrogen atmosphere. The onset of the polymerization exotherm was taken as the polymerization temperature. The volatility of each crosslinking agent alone was compared by isothermogravimetric analysis which measures the weight loss below the polymerization temperature, i.e., at 175° under a nitrogen atmosphere. Identical polymer formulations containing either no crosslinking agent, 10% of a prior art crosslinking agent known to the prior art, or 10% of a crosslinking agent of the instant invention were compared as a wire product. Extrusion of each polymer formulation from a ¾" extruder produced a thin walled insulation (10 mil) on 20 AWG tin plated copper conductor. Each wire sample was irradiated to 12 megarads and annealed in air at 150° for 1 hour. These wire insulations were compared in terms of processing behavior and product appearance. The results are provided in Table II. These data clearly show the advantages of the crosslinking agents of the instant invention as demonstrated by excellent processing behavior and product appearance.

TABLE II

Processing Behavior of ETFE Polymer Formulations Containing Crosslinking Agents.

| Identification | Crosslinking Agent Structure | $T_p$ Deg. | Volatility % Loss | Concentration[1] % | Processing Behavior | Product Appearance |
|---|---|---|---|---|---|---|
| Control | N/A | N/A | N/A | 0 | excellent | smooth, clear |
| A[2] | $CH_2=CH-CH_2-O$ attached to triazine ring with two $-O-CH_2-CH=CH_2$ groups | 220 | ≧40 | 10 | very poor | voids, tan |
| B[2] | $CH_2=CH-CH_2-N$ and $N-CH_2-CH=CH_2$ on barbiturate-type ring with $CH_2-CH=CH_2$ | 250 | ≧40 | 10 | very poor | voids, tan |
| C[2] | Bis-maleimide of phenylene diamine | 230 | 4.4 | 10 | very poor | many lumps, tan |
| D[2] | $CH_2=CH-CH_2-O-CO$—phenyl—$SO_2$—phenyl—$CO-O-CH_2-CH=CH_2$ | 210 | 0.2 | 10 | very difficult | rough, light tan |
| E[2] | Bisphenol-A bis(allyl carbonate/ester) type structure with $CH_2=CH-CH_2-O-CO$— groups | 280 | 1.1 | 10 | difficult | rough, lumps, off-white |

TABLE II-continued

Processing Behavior of ETFE Polymer Formulations Containing Crosslinking Agents.

| Identification | Crosslinking Agent Structure | $T_p$ Deg. | Volatility % Loss | Polymer Formulation Containing Crosslinking Agent Concentration[1] % | Processing Behavior | Product Appearance |
|---|---|---|---|---|---|---|
| $F^2$ | (structure) | 360 | 15.6 | 10 | good | rough, white |
| $G^2$ | (structure) | 330 | 0.0 | 10 | good | rough, white |
| $H^2$ | (structure) | 170 | — | 10 | very difficult | very rough, brown |
| I | (structure) | 300 | 1.3 | 10 | excellent | smooth, white |
| II | (structure) | 260 | 0.9 | 10 | excellent | smooth, white |

TABLE II-continued
Processing Behavior of ETFE Polymer Formulations Containing Crosslinking Agents.

| Identification | Crosslinking Agent Structure | $T_p$ Deg. | Volatility % Loss | Polymer Formulation Containing Crosslinking Agent Concentration[1] % | Processing Behavior | Product Appearance |
|---|---|---|---|---|---|---|
| III | (structure) | 250 | 0.9 | 10 | excellent | smooth, white |
| IV | (structure) | 260 | 2.7 | 10 | excellent | smooth, white |
| V | (structure) | 245 | 1.1 | 10 | excellent | smooth, white |
| VI | (structure) | 250 | 1.0 | 10 | excellent | smooth, white |

[1] weight percent, added to polymer formulation.
[2] compounds not in accordance with the present invention

EXAMPLE III

To demonstrate the unexpectedly significant, and commercially important levels of crosslinking obtained from compounds of the instant invention, identical polymer formulations containing none or 4% of a prior art crosslinking agent or 4% of a crosslinking agent of the instant invention, were compared as compression molded slabs. These slabs were prepared by melt mixing at 320° for 5 minutes, compression molding at 320° (2 minutes, 10,000 psi), irradiation to 6 megarads and annealing at 150° for 15 minutes. These identical polymer formulations, containing the equivalent concentrations of extrusion stable crosslinking agents from the prior art or one of the instant invention, as shown in the previous example, were evaluated by tensile and modulus measurements. Results are reported in Table III. As is apparent from examination of this Table, the crosslinking agents of the present invention show a significantly greater level of crosslinking (25% or more) than prior art crosslinking agents capable of withstanding extrusion at temperatures above about 250°. The unique, and unexpected, combination of properties obtained in compounds of the instant invention are dramatically demonstrated by a comparison of Tables II and III. This comparison of processability and crosslinking levels of these polymeric compositions clearly shows the outstanding combination of properties obtained in those polymeric compositions of the present invention.

TABLE III

Radiation Response of ETFE Polymer Formulations Containing Crosslinking Agents

| Identification | Crosslinking Agent Structure | Melt Extrudable[1] at T > 250° | Tensile Strength, 23° psi | $M_{100}$, 320° psi |
|---|---|---|---|---|
| Control | N/A | N/A | 6500 | melts |
| E[2] | $CH_2=CH-CH_2-O-C(=O)-$[indane core with CH$_3$ groups]$-C_6H_4-N(=O)-O-CH_2-CH=CH_2$ | YES | 6450 | 26 |
| F[2] | $CH_2=CH-CH_2-N$[pyromellitic diimide]$-N-CH_2-CH=CH_2$ | YES | 5262 | 19 |
| G[2] | $CH_2=CH-CH_2-N$[bicyclic diimide]$-N-CH_2-CH=CH_2$ | YES | 6525 | 70 |
| I | bis(diallyl isocyanurate) linked by $-CH_2-$ | YES | 7645 | 75 |
| II | bis(diallyl isocyanurate) linked by $-(CH_2)_2-$ | YES | 7656 | 105 |
| III | bis(diallyl isocyanurate) linked by $-(CH_2)_4-$ | YES | 6915 | 85 |

TABLE III-continued
Radiation Response of ETFE Polymer Formulations Containing Crosslinking Agents

| Identification | Crosslinking Agent Structure | Melt Extrudable[1] at T >250° | Tensile Strength, 23° psi | $M_{100}$, 320° psi |
|---|---|---|---|---|
| IV | (structure shown) | YES | 6810 | 86 |
| V | (structure shown) | YES | 6822 | 101 |
| VI | (structure shown) | YES | 7189 | 98 |

[1] Without foaming or discoloration, as demonstrated in Table II.
[2] Compounds not in accordance with the present invention.

EXAMPLE IV

To illustrate the significant, and commercially important, enhancement of mechanical performance of shaped articles fabricated from compositions of the instant invention, identical ETFE polymer formulations containing none or 10% of a prior art crosslinking agent or 10% of a crosslinking agent of the instant invention, were compared as a wire product. Extrusion of each polymer formulation from a ¾" extruder produced a thin walled insulation (10 mil) on 20 AWG tin plated copper conductor. Each wire sample was irradiated to 10 Mrads and annealed in air at 140° for 30 minutes. These wire insulations were compared by crosslink density, cut through resistance and crossed wire abrasion resistance measurements. The results are summarized in Table IV.

These data, again clearly show the advantages of the polymeric compositions of the instant invention, as demonstrated by the excellent mechanical performance.

TABLE IV
Mechanical Performance of ETFE Polymer Formulations Containing Crosslinking Agents

| Sample Identification* | Crosslink Density $M_{100}$, psi | Cut Through Resistance 150°, lbs | Crossed Wire Abrasion Resistance[1] 23° cycles |
|---|---|---|---|
| Control | melts | 3.9 | $1 \times 10^3$ |
| E[2] | 97 | 4.1 | $2 \times 10^3$ |
| F[2] | 65 | 4.5 | $2 \times 10^3$ |
| G[2] | 220 | 6.3 | $4 \times 10^3$ |
| IV | 680 | 8.0 | $7 \times 10^5$ |
| II | 820 | 8.4 | $3 \times 10^6$ |

[1] load = 1.2 Kg
[2] compounds not in accordance with the present invention
*see Table III for structures

EXAMPLE V

To demonstrate the practical and commercial importance of the instant invention, samples of wire, made according to the prior art and as described in Example II were evaluated in the Crossed Wire Abrasion Test. The results obtained for a representative wire specimen containing 10% of crosslinking agent II in the polymeric insulation is shown in FIG. 1 in comparison to uncrosslinked and prior art crosslinked ETFE polymer insulated wires. In the figure, the results obtained using uncrosslinked ethylene-tetrafluoroethylene copolymer are shown by the curve labeled "control sample". The results obtained using a prior art crosslinked ETFE polymer is shown in the curve labeled Sample H. The crosslinked sample H of Table II had an $m_{100}$ of 258 psi. The results obtained using a sample prepared in accordance with the present invention are shown in the curve labeled "Sample II". The sample II of Table II had an $m_{100}$ after crosslinking of 810 psi. Since this test simulates the chafing action that can occur in high-vibration areas of aircraft, this comparison clearly indicates that a desirable and significant improvement has been made in the performance of an extruded, crosslinked wire insulation (Sample II) made in accordance with the instant invention.

EXAMPLE VI

The level of crosslinking obtained from a given fluorocarbon formulation may be influenced by the formulation temperature during irradiation. To demonstrate that significantly higher levels of crosslinking can be obtained by irradiation at elevated temperature, identical polymer formulations containing none or 10% of a prior art crosslinking agent or 10% of a cross-linking agent of the instant invention, were compared as extruded tapes. These tapes were prepared by melt extruding the polymer formulations into tapes at 310°, irradiation to 10 megarads at a specified elevated temperature (20°, 70°, 145° or 220°), and then annealing in air at 150° for 1 hour. These identical extruded polymer tapes containing equivalent concentrations of either a crosslinking agent from the prior art or one of the present invention were evaluated by $M_{100}$ measurement. The results are reported in Table V. As is apparent from examination of this table, a surprising, and unexpected, increase in crosslinking level (>25%) results from irradiation of the polymer formulations above ~80°. Further examination of this table also indicates that polymer formulations containing crosslinking agents of the present invention show substantially greater levels of crosslinking (85%) greater than prior art crosslinking agents.

Table V

| Irradiation of Polymer Formulations at Elevated Temperatures | | | | |
|---|---|---|---|---|
| Crosslinking | $M_{100}$ as a Function of Irradiation Temp., psi | | | |
| Agent* | 20° | 70° | 145° | 220° |
| Control | melts | melts | melts | melts |
| G[1] | 117 | 134 | 173 | 172 |
| II | 389 | 349 | 870 | 611 |
| IV | 157 | 122 | 227 | 194 |

[1]compound not in accordance with the present invention.
*see Table III for structures

EXAMPLE VII

Another commercially significant advantage of the crosslinking agents of the instant invention over prior art compounds is greater polymer formulation stability after processing. The advantage is commercially important because irradiation processing cannot always be conducted within a few hours after the melt fabrication. Many prior art crosslinking agents bloom or segregate from the polymer formulation within a short time period after incorporation so as to reduce, sometimes significantly reduce, the level of crosslinking obtained after irradiation of the polymer formulation. To demonstrate this advantage, identical ETFE polymer formulations containing various concentrations of a prior art crosslinking agent, a mixture of prior art crosslinking agents, 10% of a crosslinking agent of the instant invention or a blend of crosslinking agents were compared as wire insulation after extrusion from a ¾" extruder to produce a thin wall (10 mil) insulation on 20 AWG tin plated copper conductor. After exposure of a portion of each wire sample to a temperature of 150° for 1.5 hours, these wire insulations were irradiated to 10 megarads, annealed at 150° for 1 hour and then subjected to identical analyses for comparison. The results are summarized in Table VI. Examination of these data clearly shows the advantages arising from improved compatibility of the crosslinking agents of the instant invention, as demonstrated by higher modulus measurements. It is believed that the improved compatibility of compounds of the present invention reduces the tendancy of these compounds to segregate (phase separate) and crystallize. Such crystallization, accompanied by phase separation in the polymer composition, may cause blooming of the crosslinking agent so as to cause the compound to function ineffectively. Crosslinking agents of the present invention demonstrate unexpectedly improved compatibility with ETFE polymer compositions as clearly shown in Table VI.

TABLE VI

Summary of Polymer Formulation Stability

| | | | Not Preannealed | | | Preannealed | | |
|---|---|---|---|---|---|---|---|---|
| Crosslinking Agent | | | Tensile Str. | Ult. Elong. | $M_{100}$ | Tensile Str. | Ult. Elong. | $M_{100}$ |
| Ident. | Structure | % | psi | % | psi | psi | % | psi |
| H | 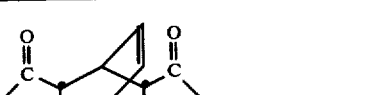 | 2 | 7520 | 130 | 213 | 8305 | 168 | 145 |
| | | 4 | 8575 | 140 | 347 | 8340 | 172 | 170 |
| | | 6 | 8385 | 137 | 351 | 8380 | 172 | 162 |
| | | 8 | 8220 | 148 | 322 | 7870 | 162 | 153 |
| H' | 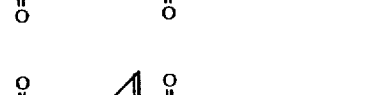 | 2 | 7625 | 90 | 588 | 8090 | 107 | 505 |
| | | 4 | 8939 | 102 | 708 | 7710 | 112 | 425 |

TABLE VI-continued
Summary of Polymer Formulation Stability

| Ident. | Crosslinking Agent Structure | % | Not Preannealed Tensile Str. psi | Ult. Elong. % | M100 psi | Preannealed Tensile Str. psi | Ult. Elong. % | M100 psi |
|---|---|---|---|---|---|---|---|---|
| | +2% CH₂=CH—CH₂—N(triazine ring with three allyl groups)—CH₂—CH=CH₂ | 6 | 8235 | 108 | 553 | 7950 | 113 | 455 |
| | | 8 | 7955 | 108 | 558 | 7705 | 128 | 371 |
| II | (bis-triazine structure with four allyl groups and (CH₂)₂ bridge) | 2 | 7500 | 132 | 190 | 8290 | 130 | 289 |
| | | 4 | 7825 | 113 | 262 | 7450 | 103 | 274 |
| | | 6 | 7655 | 105 | 369 | 7010 | 63 | 467 |
| | | 8 | 7650 | 95 | 420 | 7585 | 85 | 465 |
| II' | (bis-triazine structure with four allyl groups and (CH₂)₂ bridge) | 2 | 6041 | 77 | 358 | 7535 | 97 | 380 |
| | | 4 | 7260 | 90 | 533 | 7230 | 80 | 558 |
| | +2% CH₂=CH—CH₂—N(triazine ring with three allyl groups)—CH₂—CH=CH₂ | 6 | 7795 | 93 | 558 | 7385 | 80 | 550 |
| | | 8 | 7810 | 85 | 692 | 8801 | 53 | 640 |

We claim:

1. A shaped article which article is the product of the process of subjecting a composition comprising a radiation crosslinkable polymer and from about 0.1 weight percent up to about 50 weight percent of at least one compound of the structural formula:

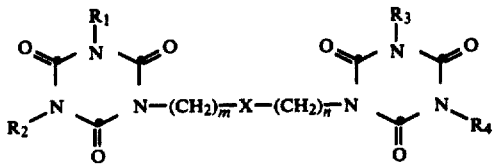

wherein $R_1$, $R_2$, $R_3$ and $R_4$ are independently vinyl, allyl, methallyl, propargyl, crotyl, $C_1$ to $C_{18}$ alkyl or an aryl moiety having 6 to 14 ring carbons, any of which $R_1$ through $R_4$ groups may be unsubstituted or substituted with one or more inert substituent groups; wherein the X moiety is a saturated or unsaturated aliphatic moiety of 1 to 12 carbons, or saturated or unsaturated $C_1$ to $C_{18}$ heteroaliphatic, a $C_5$ to $C_{18}$ heteroaromatic, or $C_5$ to $C_{18}$ alicyclic or heterocyclic, and wherein m and n are independently 0 or an integer of 1 to 12 to at least one forming operation at a temperature in excess of the melting point of the major polymeric constituent of said composition and thereafter subjecting said article to ionizing radiation at a dose level of about 1 to 40 megarads.

2. A shaped article in accordance with claim 1 wherein said article has been subjected to ionizing radiation at a dose level of about 3 to 20 megarads.

* * * * *